(12) United States Patent
Yumita et al.

(10) Patent No.: US 6,559,553 B2
(45) Date of Patent: May 6, 2003

(54) SMALL-SIZED HYDROELECTRIC POWER GENERATING APPARATUS

(75) Inventors: Yukinobu Yumita, Nagano (JP); Toshifumi Tsuruta, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/946,473

(22) Filed: Sep. 6, 2001

(65) Prior Publication Data

US 2002/0041100 A1 Apr. 11, 2002

(30) Foreign Application Priority Data

Sep. 6, 2000  (JP) ........................................ 2000-269745
Sep. 14, 2000 (JP) ........................................ 2000-280773

(51) Int. Cl.$^7$ .............................................. H02P 9/04
(52) U.S. Cl. ......................................... 290/54; 290/43
(58) Field of Search .............................. 290/43, 44, 53, 290/54, 55; 322/3, 10

(56) References Cited

U.S. PATENT DOCUMENTS

| | | | | |
|---|---|---|---|---|
| 3,776,265 A | * | 12/1973 | O'Connor, Jr. | ........... 137/487.5 |
| 4,246,490 A | * | 1/1981 | Keramati et al. | ........... 290/1 A |
| 4,511,806 A | * | 4/1985 | May | ........................... 290/43 |
| 4,731,545 A | * | 3/1988 | Lerner et al. | ................. 290/54 |
| 5,203,172 A | * | 4/1993 | Simpson et al. | .............. 60/545 |
| 5,362,987 A | * | 11/1994 | Cassaday et al. | ............. 290/54 |
| 5,554,922 A | * | 9/1996 | Kunkel | .......................... 322/3 |

FOREIGN PATENT DOCUMENTS

JP   2-65775   5/1990

* cited by examiner

Primary Examiner—Nicholas Ponomarenko
(74) Attorney, Agent, or Firm—Sughrue Mion, PLLC

(57) ABSTRACT

A small-sized hydroelectric power generating apparatus includes a body case having a fluid passage, a water wheel provided at the above fluid passage and rotating with passing of the fluid having the predetermined flowing amount, a rotator coupled to this water wheel, and rotating with the water wheel, the rotator serving as a rotor portion arranged opposed to a stator portion, the rotor portion being relatively rotated in relation to the stator portion by passing the fluid to generate electric power, the stator portion having comb-shaped pole teeth which are arranged in the circumferential direction at regular intervals so as to be opposed to the peripheral surface of a rotor magnet of the above rotor portion, and a circumferential gap between the adjacent pole teeth is set to 1.5 times or less the size of a radial gap between each pole tooth and the rotor magnet.

13 Claims, 10 Drawing Sheets

SMALL-SIZED HYDROELECTRIC POWER GENERATING APPARATUS

BACKGROUND OF INVENTION

1. Field of Invention

The present invention relates to a small-sized hydroelectric power generating apparatus using water power generated by flow of water passing through a faucet.

2. Related Art

Conventional, an automatic water faucet apparatus is known well, in which by detecting by a sensor that a user holds out his hand beneath a faucet, water flows from the faucet. Further, recently, an apparatus is also proposed, in which a small-sized power generating apparatus is provided at a fluid passage of such the automatic water faucet apparatus, and the consumption power of a circuit of the afore-mentioned sensor is supplied by storing the electric power obtained by this small-sized power generating apparatus (refer to Unexamined Japanese Utility Model Publication Hei. 2-65775).

The constitution of the afore-mentioned small-sized hydroelectric power generating apparatus will be briefly described below. A water wheel is provided at a fluid passage used as a passage of flowing water, and this water wheel rotates upon reception of water power of the flowing water. For a rotational shaft of the water wheel, a rotator integrally fixed to the shaft is provided. The outer surface of this rotator becomes a magnetized rotor magnet, and this rotor magnetic is arranged opposed to pole teeth of a stator portion with a wall of non-magnetic member between. Further, for this stator portion, a stator coil is provided so as to interlink to magnetic fluxes passing the pole tooth. And, the above-mentioned water wheel rotates upon reception of the water power of the flowing water, whereby the rotor magnetic rotates relatively in relation to the stator portion. Since the rotor is magnetized multipolar, change is produced in flow of the magnetic fluxes flowing in the stator portion. As a result, an electromotive force is produced in the stator coil in a direction where the change in the flow of the magnetic fluxes can be prevented. After this electromotive force was rectified, it is stored in a storage battery.

As described above, the small-sized hydroelectric power generating apparatus is so constructed that the water wheel receives the water power of the flowing water, whereby the multipolar magnetized rotor magnet rotates together with the water wheel. By the way, between this rotor magnet and the pole tooth arranged outside of the magnet so as to be opposed to the magnet, detent torque is produced. This detent torque gives resistance to rotation of the water wheel. Therefore, such a problem is produced that the water wheel does not rotate smoothly, or the water wheel does not rotate at all if the amount of the flowing water is a little. If the gap between the rotor magnet and the pole tooth is expanded, the detent torque is reduced, so that the afore-mentioned problem can be prevented. However, the effective magnetic fluxes necessary to generate the electric power are also reduced together. Accordingly, if the gap between them is made wider than it needs, the electric power cannot be generated effectively. From this reason, in this type of small-sized hydroelectric power generating apparatus, such a proposition that power generation is performed efficiently with a smaller amount of flowing water cannot be solved.

Further, the above-mention small-sized hydroelectric power generating apparatus is so constructed that a water wheel is surrounded with a wall, and an ejection hole for ejecting water to vane portions of the water wheel is formed in this wall. This ejection hole is used in order to rotate the water wheel efficiently by suitably throttling the amount of the water entering from an inlet. It is important to improve the rotational efficiency of the water wheel since it connects to the improvement of the power generation efficiency of the electric power generating apparatus. In order to improve the ejection efficiency of water, it is necessary to calculate more accurately positional accuracy between the ejection hole and the vane portion of the water wheel, an angle of the ejection hole to the water wheel, a hole diameter, a shape of the wall having the ejection hole, a shape of a fluid passage outside of the wall, and to perform a high level of machining.

In consideration of the rotational efficiency of the water wheel, it is preferable that the number of the above-mentioned ejection holes is three, four, or more. In addition, the ejection hole is orthogonally opposed to the vane of the water wheel, which contributes to improvement of the rotational efficiency of the water wheel. However, in case that the number of the ejection holes is three or more, and the ejection hole is not opposed to the central axis but orthogonally opposed to the vane, machining is very complicated and expensive. Namely, it is because it is necessary to increase the number of molds at the machining time of the wall according to the number of the ejection holes and facing (angle) of the hole or to turn-separate the mold at the mold separation time.

Accordingly, in the conventional cases, a water wheel that is cheap in a molding cost is selected rather than the rotational efficiency of the water wheel. Namely, so that the apparatus can be molded with a two-divided and simple two-directional separation mold, the number of the above-mentioned ejection holes is set to two or one, and the angle of each ejection hole to the water wheel is frequently set to a range where machining can be performed with a simple bi-directional separation mold. Namely, in the conventional small-sized hydroelectric power generating apparatus, generally, about two ejection holes were formed in the surrounding wall of the water wheel, and there ware not many ideas for the angle of each ejection hole to the water wheel. Therefore, the rotational efficiency of the water wheel was low and the power generating efficiency was also low.

SUMMARY OF INVENTION

In view of the above problem, a first object of the invention is to provide a small-sized hydroelectric power generating apparatus constructed so that in order to effectively generate electric power with a small amount of flowing water, detent torque between the a rotor magnet and a pole tooth is kept low, and the loss of magnetic fluxes effective to power generation is small.

In view of the above problem, a second object of the invention is to provide a small-sized hydroelectric power generating apparatus which has such structure that an ejection hole for efficiently ejecting water to the water wheel can be formed without using many split molds and a complicated machining method such as turn-separation, and which can improve rotational efficiency of the water wheel and also power generating efficiency.

A small-sized hydroelectric power generating apparatus according to the invention includes a body case having a fluid passage, a water wheel that is provided at the fluid passage and rotates with passing of the fluid having the predetermined flowing amount, and a rotator that is coupled to this water wheel, rotates with the water wheel, and is used as a rotor portion arranged opposed to a stator portion, in which this rotor portion is relatively rotated in relation to the above stator portion with the passing of the fluid thereby to generate electric power. This small-sized hydroelectric power generating apparatus is provided in that the stator portion has pole teeth that are arranged in the circumferential direction at regular intervals so as to be opposed to the peripheral surface of a rotor magnet of the rotor portion, and a circumferential gap between the adjacent pole teeth is set to 1.5 times or less the size of a radial gap between each pole tooth and the rotor magnet.

As described above, the gap between the pole teeth is set to 1.5 times or less the size of the gap between each pole tooth and the rotor magnet, whereby the gap between the pole teeth becomes much narrower, so that detent torque becomes small, the water wheel and the rotator can be rotated smoothly even with a small amount of flowing water, and power generation can be efficiently performed. According to the above-mentioned structure, without expanding the radial gap between each pole tooth and the rotor magnet, the detent torque can be reduced. Therefore, without reducing the magnetic fluxes effective in rotating the rotor, the rotor can be rotated with the large torque.

Further, according to another aspect of the invention, in the afore-mentioned small-sized hydroelectric power generating apparatus, the stator portion is composed of two phases that are not in the phase. Therefore, the detent torque becomes smaller, and the water wheel and the rotator can be rotated more smoothly.

According to another aspect of the invention, in the above-mentioned small-sized hydroelectric power generating apparatus, magnetic insulation is applied between adjacent stator cores of the two-phases stator portion. Therefore, the stator portions of the respective phases cancel the detent torque of each other, their detent torque approximate a sine waveform, and the detent torque becomes smaller. Therefore, the water wheel and the rotator can be rotated more smoothly.

According to another aspect of the invention, in the above-mentioned small-sized hydroelectric power generating apparatus, two stator cases are provided so as to respectively cover the two-phases stator portion, and these two stator cases are magnetically connected. Therefore, the detent torque cancellation between the magnetically insulated stator cores becomes stronger, so that the detent torque can be reduced more.

According to another aspect of the invention, in the above-mentioned small-sized hydroelectric power generating apparatus, each of the pole teeth is formed nearly in the shape of a trapezoid. Therefore, the detent torque becomes smaller and the effective magnetic fluxes for rotating the rotor become larger.

According to another aspect of the invention, a small-sized hydroelectric power generating apparatus includes a body case having a fluid passage, a water wheel that is provided at the fluid passage and rotates with passing of the fluid having the predetermined flowing amount, and a rotator that is coupled to this water wheel, rotates with the water wheel, and is used as a rotor portion arranged opposed to a stator portion, in which this rotor portion is relatively rotated in relation to the above stator portion with the passing of the fluid thereby to generate electric power. This small-sized hydroelectric power generating apparatus is provided in that: a support member for holding one end of a shaft for supporting rotation of the water wheel is provided for the body case; a water spouting portion having an ejection hole from which the fluid is blown on vanes of the water wheel with the flowing amount throttled is provided for the fluid passage; and at least a part of this water spouting portion is provided integrally with the above body case.

According to the above aspect, the water spouting portion which spouts the fluid on the vanes of the water wheel and surrounds the water wheel is formed integrally with the body case, and the support member for holding one end of the shaft for supporting rotation of the water wheel is provided for the body case. Therefore, the positional accuracy among the water-spouting portion that surrounds the water wheel, the ejection hole formed in the water-spouting portion, and the shaft for supporting the rotation of the water wheel becomes good.

Accordingly, the rotational accuracy of the water wheel in relation to the water-spouting portion becomes good, so that the distance as gap between the peripheral end of the water wheel and the inner wall of the water-spouting portion can be narrowed. As a result, the fluid blown out from the ejection hole can be efficiently dashed on the water wheel, and the water wheel can be efficiently rotated.

Further, according to another aspect of the invention, a small-sized hydroelectric power generating apparatus includes a body case having a fluid passage, a water wheel that is provided at the fluid passage and rotates with passing of the fluid having the predetermined flowing amount, and a rotator that is coupled to this water wheel, rotates with the water wheel, and is used as a rotor portion arranged opposed to a stator portion, in which this rotor portion is relatively rotated in relation to the stator portion with the passing of the fluid thereby to generate electric power. This small-sized hydroelectric power generating apparatus is provided in that: a water spouting portion having an ejection hole from which the fluid is blown on vanes of the water wheel with the flowing amount throttled is provided for the fluid passage; the ejection hole is so constituted as to be opened in the axial direction of a shaft; and this opened portion is closed by another member thereby to form the ejection hole.

According to the above aspect, one axial side of the ejection hole of the water-spouting portion is opened and this opened portion is pushed from the other side. Therefore, such the constitution that the number of the ejections holes of the water spouting portion is set to three, four, or more and the ejection holes are orthogonally opposed to the vane portions of the water wheel in order to heighten the rotational efficiency of the water wheel can be formed by a simple bi-directional split mold. Accordingly, a small-sized hydroelectric power generating apparatus can be obtained, which can be manufactured at a low mold cost and has the water-spouting portion that can blow the fluid on the water wheel efficiently. Further, the water-spouting portion may be formed integrally with the body case, or may be composed of another member and incorporated into the body case.

According to another aspect of the invention, in the above-mentioned small-sized hydroelectric power generating apparatus, the water spouting portion is defined by plural walls formed integrally with the body case and a cover put on leading ends of these walls, and the ejection hole is opened to the cover side and covered with this cover thereby to form the ejection hole. Therefore, a small-sized hydroelectric power generating apparatus can be manufactured at a lower mold cost, which has the water spouting portion having such the constitution that the number of the ejections holes of the water spouting portion is set to three, four, or more and the ejection holes are orthogonally opposed to the vane portions of the water wheel in order to heighten the rotational efficiency of the water wheel.

Further, according to another aspect of the invention, in each of the above-mentioned small-sized hydroelectric power generating apparatuses, a plurality of the ejection holes are provided in the circumferential direction nearly uniformly, and a slope for suitably distributing the flowing amount from the inlet side of the fluid passage to each ejection hole is formed at the peripheral portion of the water spouting portion. Therefore, the water ejected from each ejection hole to the vane portion of the water wheel becomes uniform and the suitable amount of water is ejected, so that the rotational efficiency of the water wheel further improves.

Further, according to another aspect of the invention, in each of the above-mentioned small-sized hydroelectric power generating apparatuses, a cap-shaped case is fitted to the body case thereby to form an inner space; the rotator is provided in this inner space and this inner space and the stator portion are separated from each other; a recess portion is provided for a fitting portion of the body case to the cap-shaped case; an opposing wall opposed to an inner wall of the recess portion is provided for a fitting portion of the cap-shaped case to body case; when the cap-shaped case is fitted into body case while it is being pressed against body case, a ring-shaped elastic seal member is provided, which is held between the opposing wall and the inner wall of the recess portion in the direction orthogonal to its fitting direction; and supporting members that respectively support both ends of the shaft for supporting the rotator are provided for the body case and the cap-shaped case.

According to the above aspect, after the body case and the cap-shaped case were united, the elastic seal member is not pressed in the fitting direction but receives the pressing force from the both cases in the direction orthogonal to the fitting direction. Therefore, the both cases do not have disadvantage that flotation is produced by elastic repulsive power of the elastic seal member and the positional relation in the fitting direction changes with the passage of time. Accordingly, the positional relation between the shaft supporting members respectively provided for the both cases becomes better.

BRIEF DESCRIPTION OF THE DRAWINGS

FIG. 2 is a diagram showing the constitution of a water wheel and a rotator, in which FIG. 2(A) is a front view viewed from the same direction as the direction of FIG. 1, FIG. 2(B) is a plan view viewed from the direction of an arrow B in FIG. 2(A), and FIG. 2(C) is a bottom view viewed from the direction of an arrow C in FIG. 2(A).

FIG. 10 is a diagram showing a cover that constitutes a part of a fluid passage, in which FIG. 10(A) is a plan view viewed from a direction of an arrow V in FIG. 1, and FIG. 10(B) is a cross-sectional view taken along a line A–A' in FIG. 10(A).

DETAILED DESCRIPTION OF PREFERRED EMBODIMENTS

A small-sized hydroelectric power generating apparatus according to a mode for carrying out the invention will be described with reference to drawings.

Figure 1:
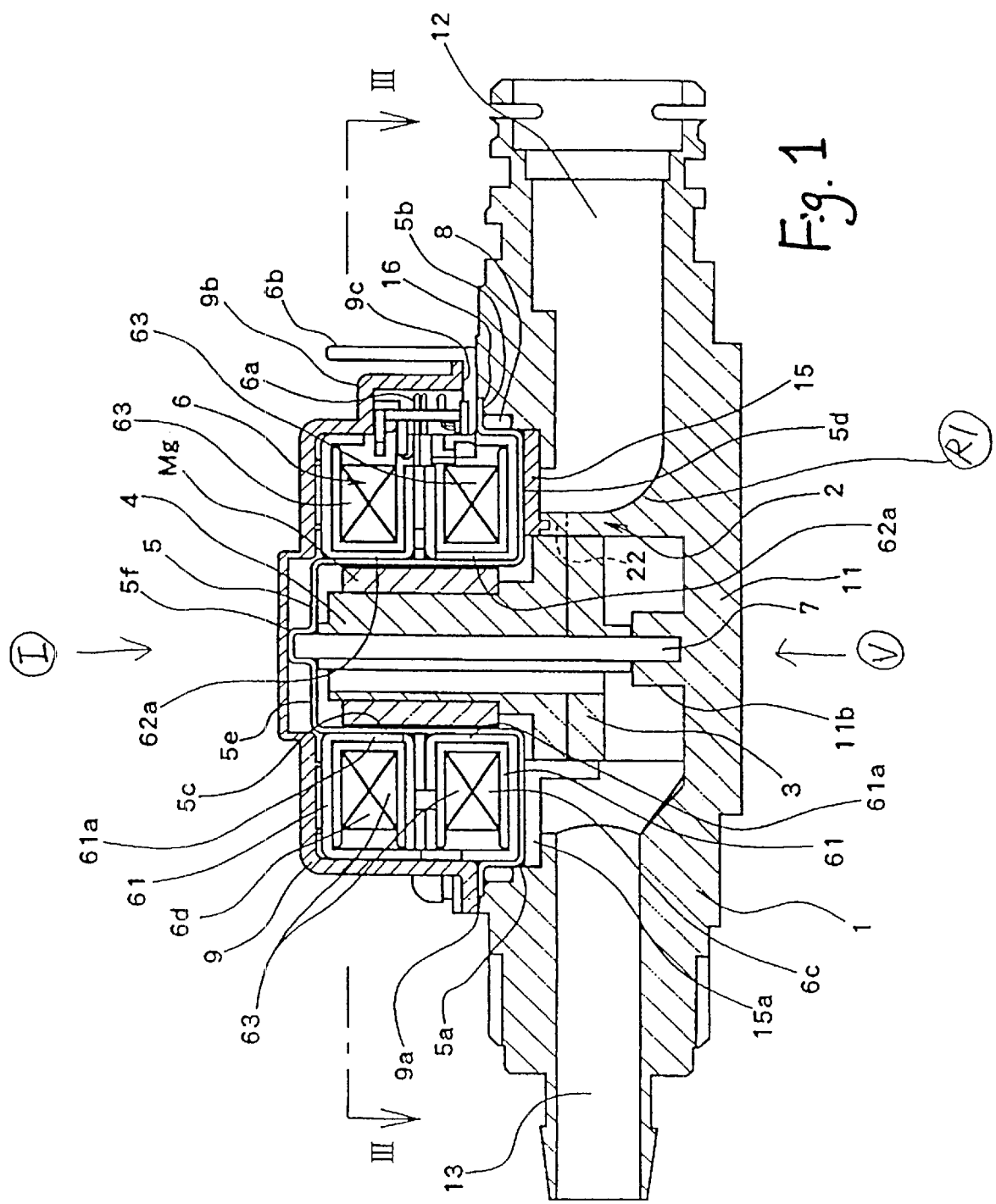
FIG. 1 is a longitudinal cross sectional view of a small-sized hydroelectric power generating apparatus according to a mode for carrying out the invention.

As shown in FIG. 1, the small-sized hydroelectric power generating apparatus according to the mode for carrying out the invention includes a body case 1 having an inlet 12 of a fluid passage and an outlet 13, a water spouting portion 2 that is provided in the body case 1 and functions as a part of the fluid passage, a water wheel 3 that is arranged inside of the water spouting portion 2 and rotates with passing of the predetermined amount of fluid, a rotator 4 that is coupled to the water wheel 3 and rotates together with the water wheel 3, a stainless cap-shaped case 5 that is arranged outside of the rotator 4 and fitted in the body case 1 thereby to form an inner space in cooperation with the body case 1, and a stator portion 6 arranged outside this cap-shaped case 5.

The body case 1 includes a main body 11, and the cylindrical inlet 12 and outlet 13 that protrude to the outside of this main body 11. The main body 11 has the water-spouting portion 2 that surrounds the outside of the water wheel 3, and a bearing hole 11b into which one end of a shaft 7 for supporting the rotator 4 is fitted thereby to be held.

Figure 10:
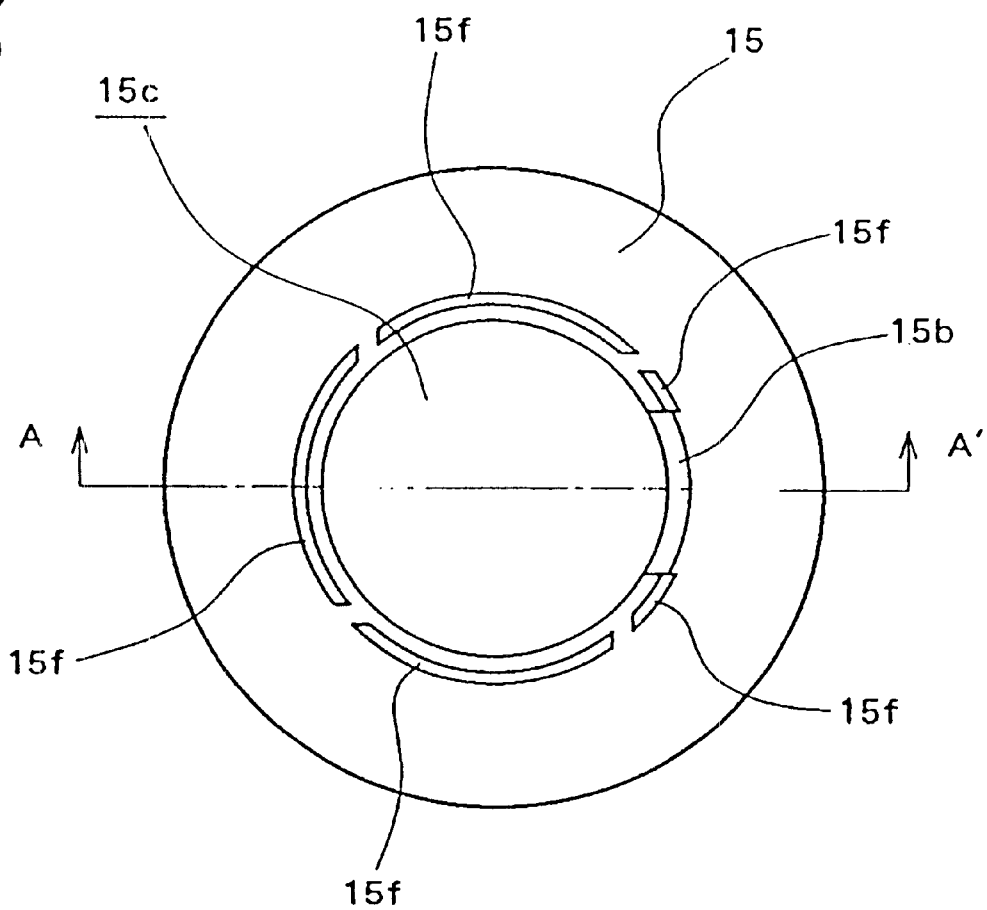
Figure 10:
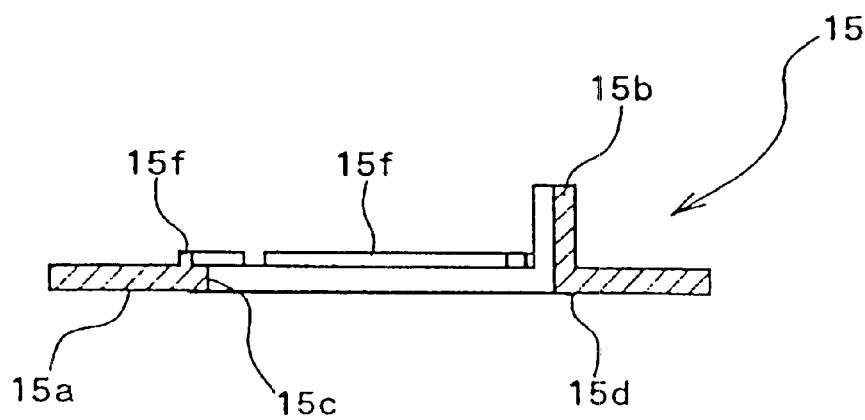

Further, the other end of the shaft 7 passes through a hole 15c of a cover 15 (refer to FIG. 10) and its leading end is fitted into a bearing hole 5f provided in the cap-shaped member 5. Hereby, the shaft 7 is held in cooperation with the both cases 1 and 5. In the small-sized hydroelectric power generating apparatus according to the mode for carrying out the invention, as described above, without receiving the elastic repulsive power of an O ring 8 that is an elastic seal member, the both cases 1, 5 are positioned axially and radially. Accordingly, in case that dimensional accuracy of each parts is good, assembly accuracy becomes also good, so that axial accuracy of the shaft 7 of which the both ends are supported respectively by the both cases 1, 5 that are different members becomes also good. Therefore, it is possible to make good accuracy in rotational position of the water wheel 3 and the rotator 4.

A ring wall portion 2 is used in order to throttle the flowing passage of the water entering from the inlet 12 to strengthen water power, blow and dash the water on a vane portion 31 of the water wheel 3, and lead the water after dashing on the vane member 31 to the outlet 13. This water-spouting portion 2 is composed of plural walls (not shown) formed integrally with the body case 1 and a cover 15 put on the leading ends of these walls. By putting the cover 15 on the leading ends of the plural walls, plural ejection holes 22 that throttle the flowing amount to blow the fluid on the vane portion 31 of the water wheel 3 are formed in its surrounding wall.

Figure 8:
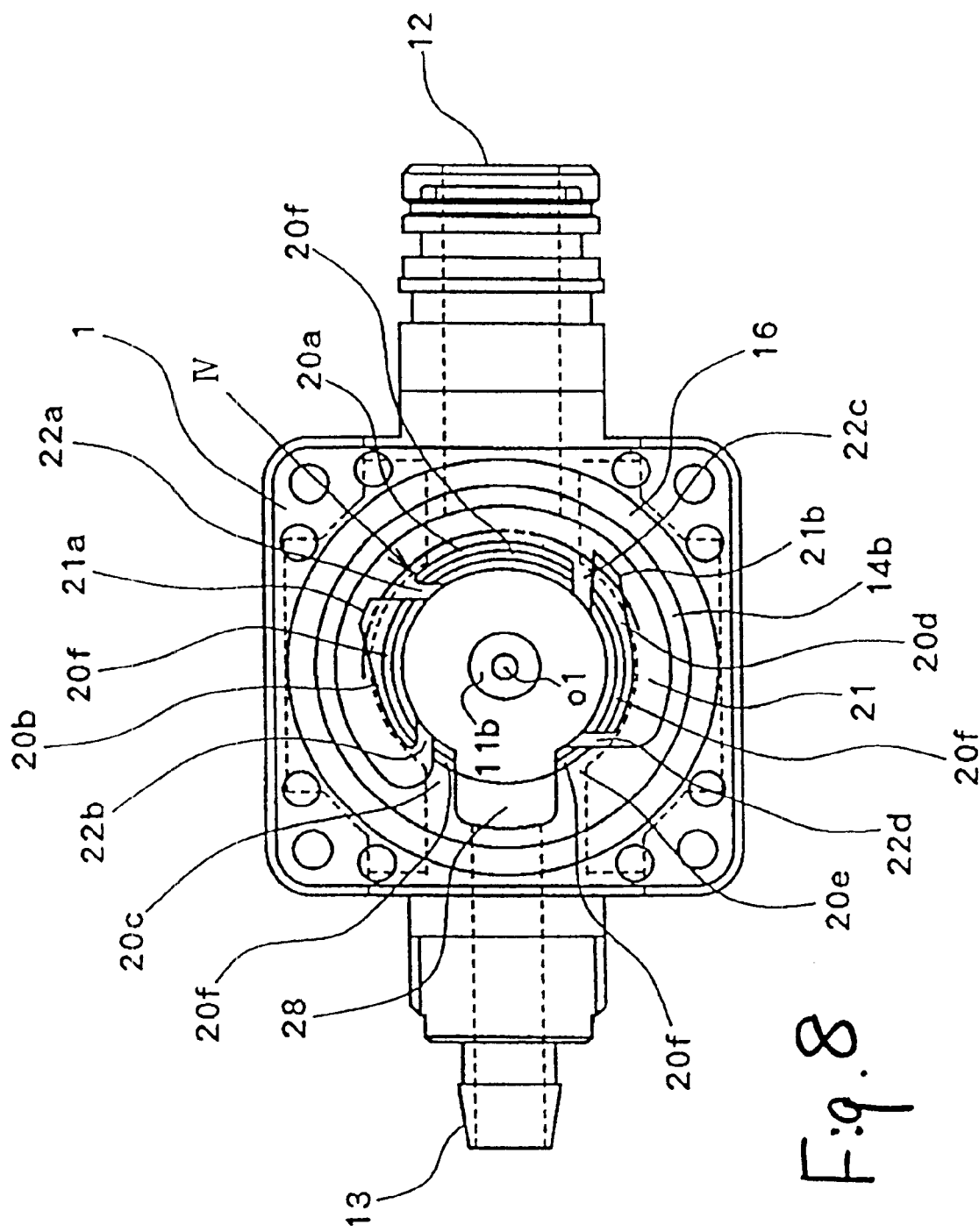
FIG. 8 is a plan view viewed from a direction of an arrow I in FIG. 1, in which a cap-shaped case, a resin case and a stator portion are removed.

Specifically, as shown in FIG. 8, the water spouting portion 2 is used in order to throttle the flowing passage of the water entering from the inlet 12 to strengthen water power, blow and dash the water on the vane portion 31 of the water wheel 3, and lead the water after dashing on the vane member 31 to the outlet 13. This water spouting portion 2 is composed of five water spouting walls 20a, 20b, 20c, 20d, 20e formed integrally with the body case 1 and the cover 15 put on the holes arranged on the leading ends of these five water spouting walls 20a, 20b, 20c, 20d, 20e.

By putting the cover 15 on the leading ends of the five water spouting walls 20a, 20b, 20c, 20d, 20e of the body case 1, the plural ejection holes 22a, 22b, 22c, 22d (in this embodiment, four ejection holes) that throttle the flowing amount to blow the fluid on the vane portion 31 of the water wheel 3 are formed in its surrounding wall. As described above, the five water spouting walls 20a, 20b, 20c, 20d, 20e forming one side of the water-spouting portion 2 are formed integrally with the body case 1. Further, the cover 15 forming the other side is positioned to the body case 1 as described later.

Accordingly, as described later, positional accuracy between the bearing hole 11b that is formed in the body case 1 and functions as a supporting member for supporting the one end of the shaft 7 for supporting rotation of the water wheel 3, and the ejection holes formed by the water spouting walls and the cover; and positional accuracy of the inner wall surrounding the water wheel 3 in relation to the water wheel 3 are good. The detailed constitution of this water-spouting portion 2 will be described later.

For the body case 1, a recess portion is provided, which has the structure for fitting therein the cap-shaped case 5 and one axial end of the stator portion 6 closely fixed to the outside of the cap-shaped case. A bottom surface of the recess portion is used as a portion for placing a flat portion 15a of a doughnut-shaped cover 15 arranged between the body case 1 and the cap-shaped case 5. The center portion of this bottom surface is a hole for communicating the fluid passage on the body case 1 and the inner space of the cap-shaped case 5, and by this hole, the inner space of the cap-shaped case 5 is communicated with the inlet 12 and outlet 13 of the fluid passage.

The cap-shaped case 5 is formed of a non-magnetic stainless member by draw machining, and composed of a flange portion 5b that is the most outer portion, an outer cylindrical portion 5a formed inside the flange 5b continuously, a partition portion 5c that is arranged inside of this outer cylindrical portion 5a and separates the inner space in which water enters from the stator portion 6, a coupling surface portion 5d for coupling the opposing wall 5a and the partition portion 5c, and a bottom portion 5e.

The thus constructed cap-shaped case 5 is fitted into the recess portion of the body case 1 with the flat portion 15a of the cover 15 between. Outside the outer cylindrical portion 5a, an O-ring 8 is arranged. The O-ring 8, while being pressed to the radial outside by this outer cylindrical portion 5a, is held between this outer cylindrical portion 5a and the inner wall of the recess portion. In the bottom portion 5e, a bearing hole 5f into which the other end of the shaft 7 for supporting the water wheel 3 and the rotator 4 is fitted is formed. This cap-shaped case 5 is used in order to separate the stator 6 from the water passing in the body case 1 and to prevent outflow of the water to the outside of the body case 1.

The inlet 12 and outlet 13 formed in the body case 1, and the main body 11 for coupling these passages are arranged at a part of a fluid passage of a water faucet apparatus (illustration is omitted) composed of a faucet, valve, and the like, so that the fluid entering into the inlet 12 from a fluid source passes through the water spouting portion 2 arranged in the main body 11 and is ejected from the outlet 13. The fluid, at this passing time, gives rotational power to the water wheel 3.

After the cap-shaped case 5 was fitted into the body case 1 and the stator portion 6 was arranged outside the case 5 as described above, a resin case 9 is put so as to cover the cap-shaped case 5 and the stator portion 6. For this resin case 9, a hood portion 9b is provided, which covers a terminal portion 6a provided so as to protrude from the stator portion 6 to the radial outside. And, for this hood portion 9b, there is provided a leading portion 9c for leading one end of a lead wire 6b of which the other end is connected to the terminal portion 6a to the outside. This leading portion 9c is filled with a sealant (not shown) for sealing the outside and the stator portion 6, thereby to prevent water from entering into the stator portion 6 through the leading portion 9c from the outside. This resin case 9 is screwed and fixed to the body case 1. This constitution is used in order to prevent the cap-shaped case 5 and the stator portion 6 from slipping off from the body case 1 and prevent them from getting out of the fixed position.

Figure 2:
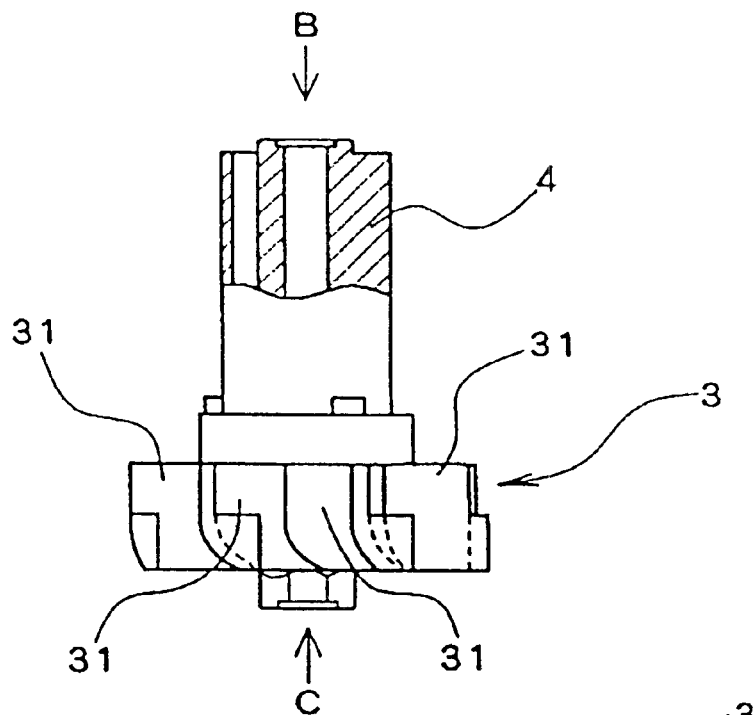
Figure 2:
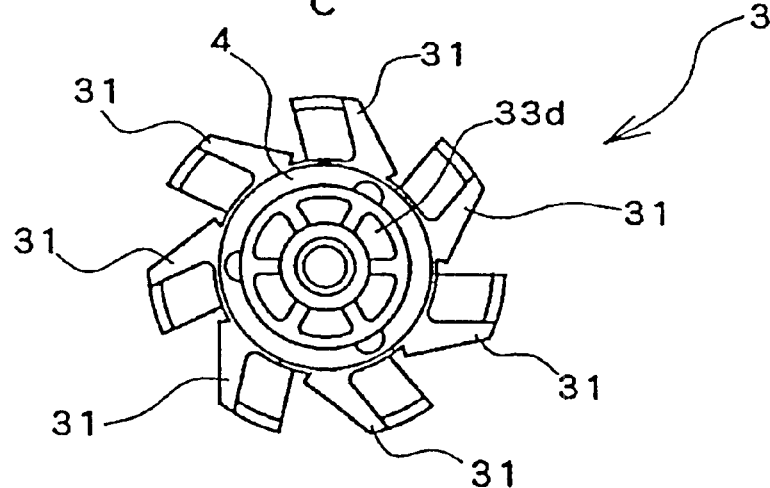
Figure 2:
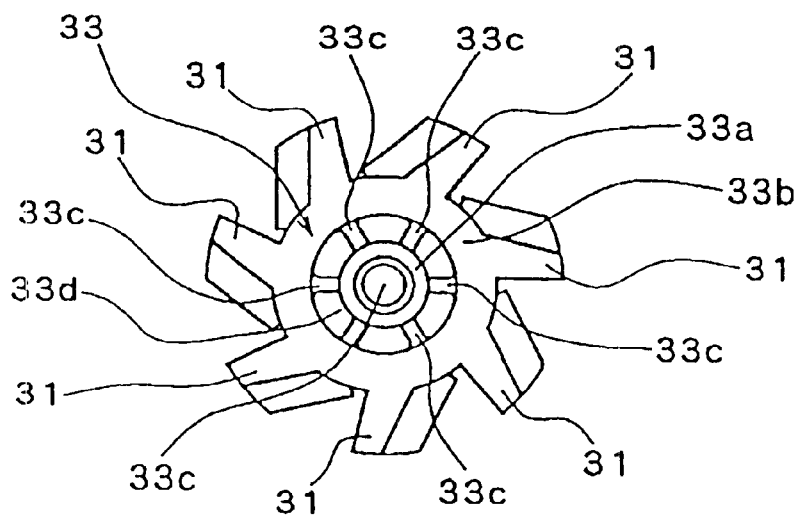

The above-mentioned water wheel 3 arranged inside the spouting portion 2 for spouting water rotates with passing of the predetermined amount of fluid. As shown in FIG. 2, the water wheel 3 comprises a rotational center portion 33 into which the above-mentioned shaft 7 is inserted, and vane members 31 of which the inner end portions are connected to this rotational center portion 33. FIG. 2 shows the water wheel 3 and the rotator 4, in which FIG. 2A is a front view, FIG. 2B is a plan view viewed from an arrow B in FIG. 2A, and FIG. 2C is a bottom view viewed from an arrow C in FIG. 2A.

The vane member 31 is curved at its midway portion so as to readily receive pressure of water ejected from each of the ejection holes 22a to 22d. Therefore, the fluid that has entered into the inlet 12 and has been throttled at each of the ejection holes 22a to 22d to heighten the pressure dashes powerfully on the vane members 31, and the water wheel 3 is rotated about the shaft 7 by its water power. The water that has dashed on the vane members 31 circulates in the space as described above, and thereafter moves to the outlet 13.

The rotational center portion 33 comprises a small cylindrical portion 33a that slidably rotates about the shaft 7, a large cylindrical portion 33b of which the diameter is larger than that of the small cylindrical portion 33a, and plural ribs 33c that couple the both cylindrical portions 33a, 33b at both ends in the axial direction. A portion between the both cylindrical portions 33a and 33b is hollow, which is penetrated axially. This portion becomes a through-hollow portion 33d, which has an entrance that uses each gap between the ribs 33c on the water wheel 3 side, and an exit that uses each gap between the ribs 33c on the rotator 4 side. This through-hollow portion 33d is used in order to, by flowing the water to be ejected to the water wheel 3 from the above entrance to the exist, circuit the water in the wheel 3 and in the space where the rotor 4 coupled to the water wheel 3 is arranged, thereby to smooth the rotation of the water wheel 3 and rotator 4. The rotator 4 is formed integrally with the water wheel 3 and coaxial with the water wheel 3. Therefore, as soon as the water wheel 3 rotates by the water power, the rotator 4 rotates about the shaft 7 integrally with the water wheel 3.

The rotator 4 that is thus coupled to the water wheel 3 and rotates together functions as a rotor opposed to the stator portion 6, and a cylindrical rotor magnet Mg is fitted onto a surface of the rotator. The outer surface of this rotor magnet Mg is multipolar magnetized. And, this outer surface is opposed to the stator portion 6 through the partition portion 5c of the cap-shaped case 5. For this reason, in case that the rotator 4 rotates together with the water wheel 3, it rotates relatively in relation to the stator portion 6.

The stator portion 6 comprises two phases 6c and 6d shifted in phase and are coaxially laminated. By constituting the stator portion 6 so as to comprise two phases, the respective phases 6c, 6d cancel the detent torque of each other, and the detent torque produced between the rotor magnet Mg and the stator portion 6 is reduced on a whole. Further, each of the phases 6c, 6d has an outer stator core 61 (located outside in the laminated state), an inner stator core (located inside in the laminated state) 62, and a coil 63 wound on a coil bobbin.

In this embodiment, the adjacent inner stator cores 62, 62 of the respective phases 6c, 6d are magnetically insulated therebetween. Further, each outer stator core 61, 61 of each phase 6c, 6d is formed nearly in the shape of a cup, and the outer ends are connected to each other, whereby the magnetic coupling is provided. Also, by these constitutions, cancellation power of the detent torque produced in the respective phases 6c, 6d becomes stronger, so that the detent torque can be reduced. Further, a coil winding start portion of the coil 63 and a coil winding end portion thereof are pulled out to the outsides of the outer stator cores 61, 61 from a window (not shown) formed in the connecting portion of the outer stator cores 61, 61, and connected respectively to the terminal portion 6a.

The outer stator core 61 has plural pole teeth 61a, which are formed by cutting up the central portion of the cap-shaped member formed by draw machining. These pole teeth 61a are formed nearly in the shape of a trapezoid and arranged in the circumferential direction at regular intervals so as to be opposed to the peripheral surface of the rotor magnet Mg. Further, the inner stator core 62 has plural pole teeth 62a similarly, which are formed in the comb shape and arranged in the circumferential direction at regular intervals so as to be opposed to the peripheral surface of the rotor magnet Mg. When the both stator cores 61 and 62 are arranged in the laminated state, the respective pole teeth 61a and the pole teeth 62a provided for the respective stator cores 61, 62 are laticely arranged and alternately in the circumferential direction.

The thus constituted stator portion 6 is fitted in the outer portion of the partition portion 5c of the cap-shaped case 5. Therefore, magnetic fluxes are flowing between the respective pole teeth 61a, 62a of this stator portion 6 and the magnetized portion of the rotator 4. When the rotator 4 rotates together with the water wheel 3 as described above, change is produced in this flow of the magnetic fluxes, and an induced voltage is produced in the coil 63 in a direction where the change of this flow is prevented. This induced voltage is taken out from the terminal portion 6a. The thus taken-out induced voltage is changed into a direct voltage by the circuit, rectified through the predetermined circuit (not shown), and stored in a battery.

Figure 3:
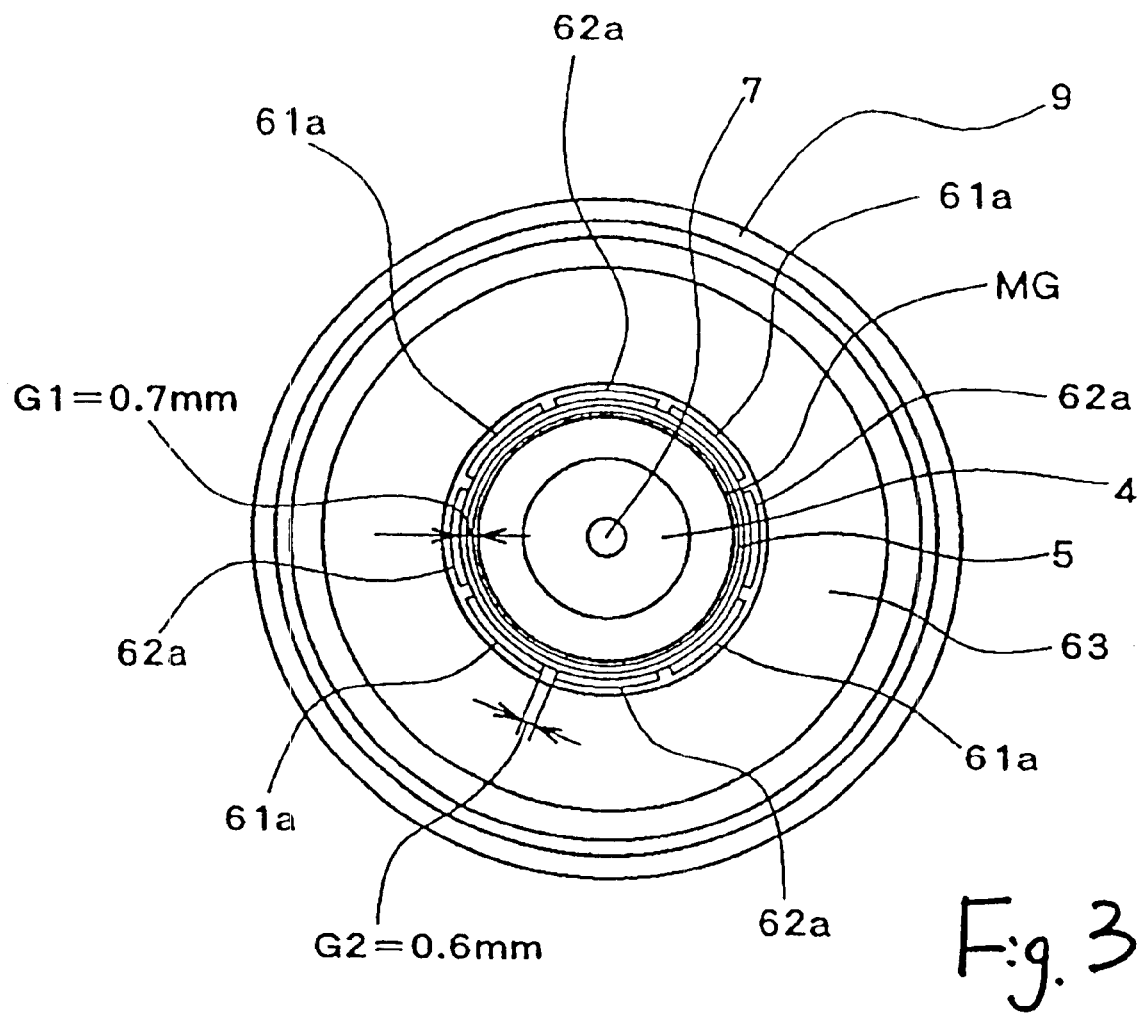
FIG. 3 is a cross-sectional view taken along a line of III—III in FIG. 1.
Figure 4:
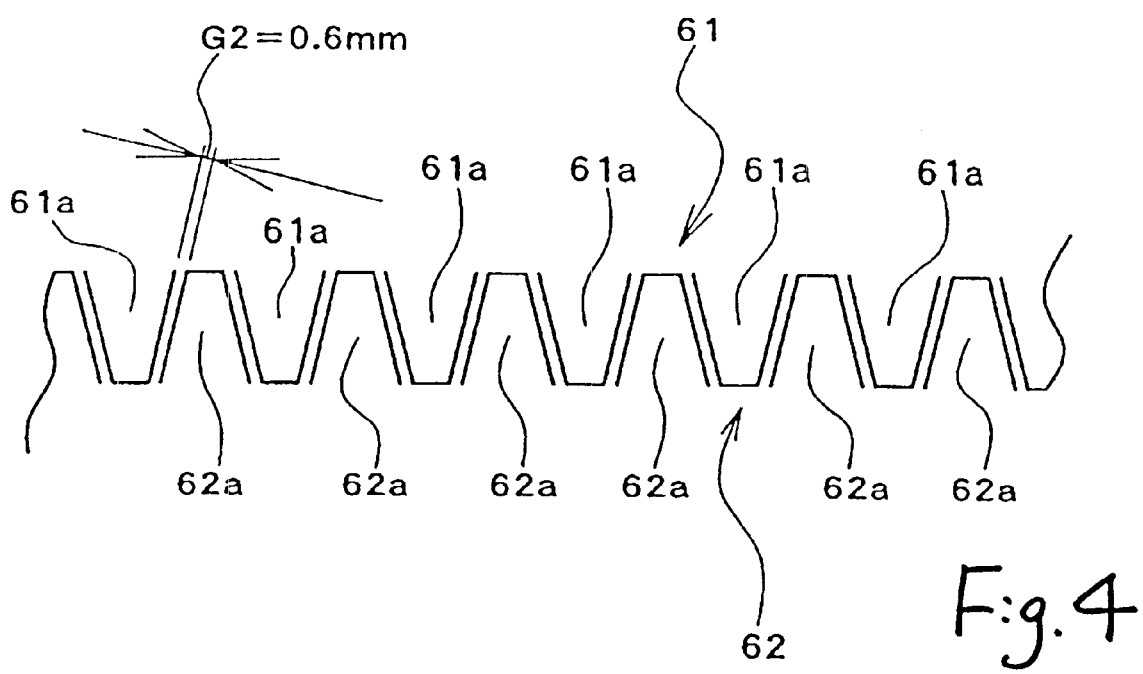
FIG. 4 is an unfolded view of pole teeth of the small-sized hydroelectric power generating apparatus shown in FIG. 1.

In the mode for carrying out the invention, as shown in FIGS. 3 and 4, a circumferential gap G2 between the adjacent pole teeth 61a and 62a is set to 0.6 mm. On the other hand, a radial magnetic gap G1 formed between each of the pole teeth 61a, 62a and the peripheral surface of the rotor magnet Mg arranged inside the partition portion 5c of the above-mentioned cap-shaped case 5 with the partition portion 5c between is set to 0.7 mm. Namely, the circumferential gap G2 is set to a smaller size than the size of the radial magnetic gap G1, so that the gap G2 is formed more narrowly than the gap between the respective pole teeth in the conventional small-sized hydroelectric power generating apparatus (In the conventional apparatus, the circumferential gap between the respective pole teeth is set to 1.5 mm and more).

Figure 5:
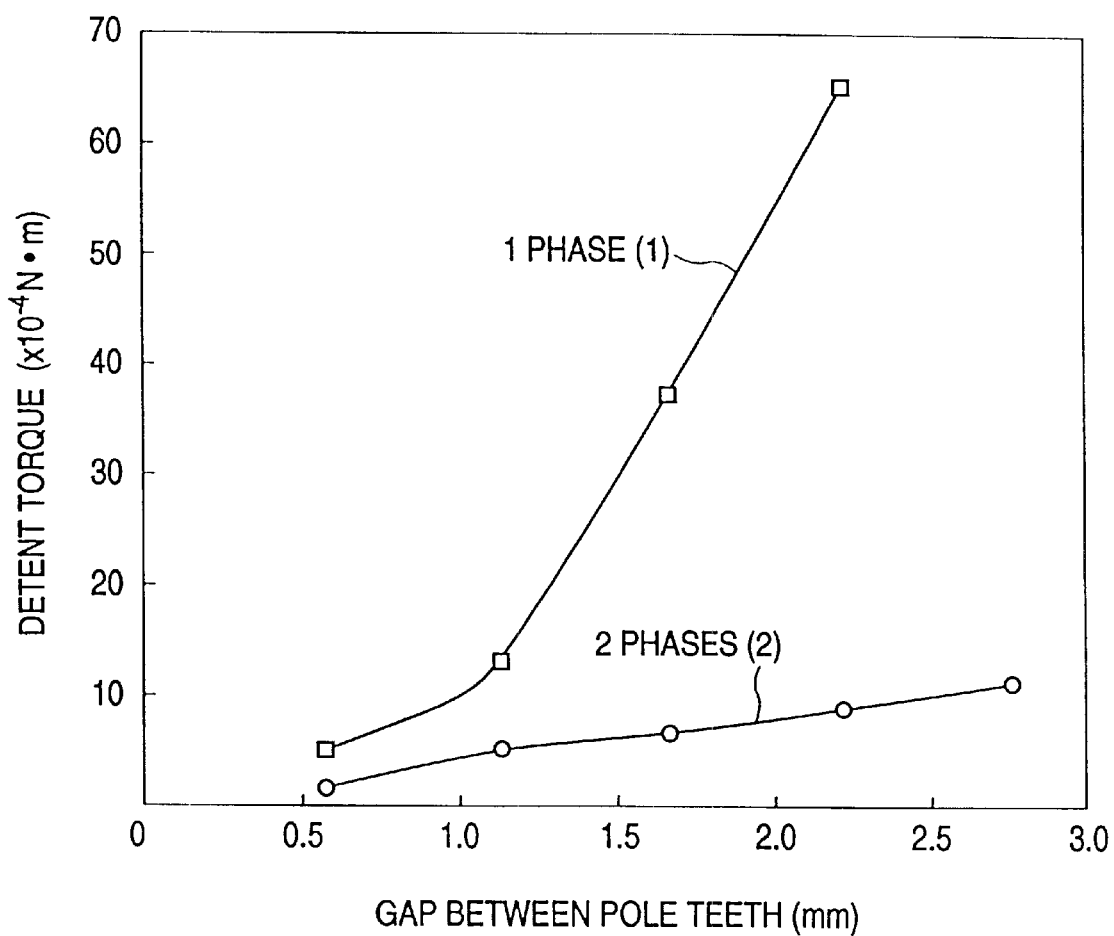
FIG. 5 is a diagram showing a relationship between a circumferential gap between respective pole teeth of the small-sized hydroelectric power generating apparatus and detent torque, in which a graph (1) shows the relation in case that a stator portion is an one-phase type, and a graph (2) shows the relation in case that the stator portion is a two-phases type.

Therefore, the detent torque is reduced and the water wheel 3 can rotate with a small amount of flowing water. Namely, as shown in FIG. 5, in case that the gap G2 between the respective pole teeth becomes wide, the detent torque produced between the rotor magnet Mg and the stator becomes large. Specifically, when the gap G1 is set to 0.7 mm, in case that the gap G2 is set to about 1.1 mm and more, the detent torque becomes large sharply. Therefore, in consideration of reduction of the detent torque, it is desirable to set the gap G2 between the respective pole teeth to at least about 1.1 mm or less which is 1.5 times or less the size of the gap G1.

Figure 6:
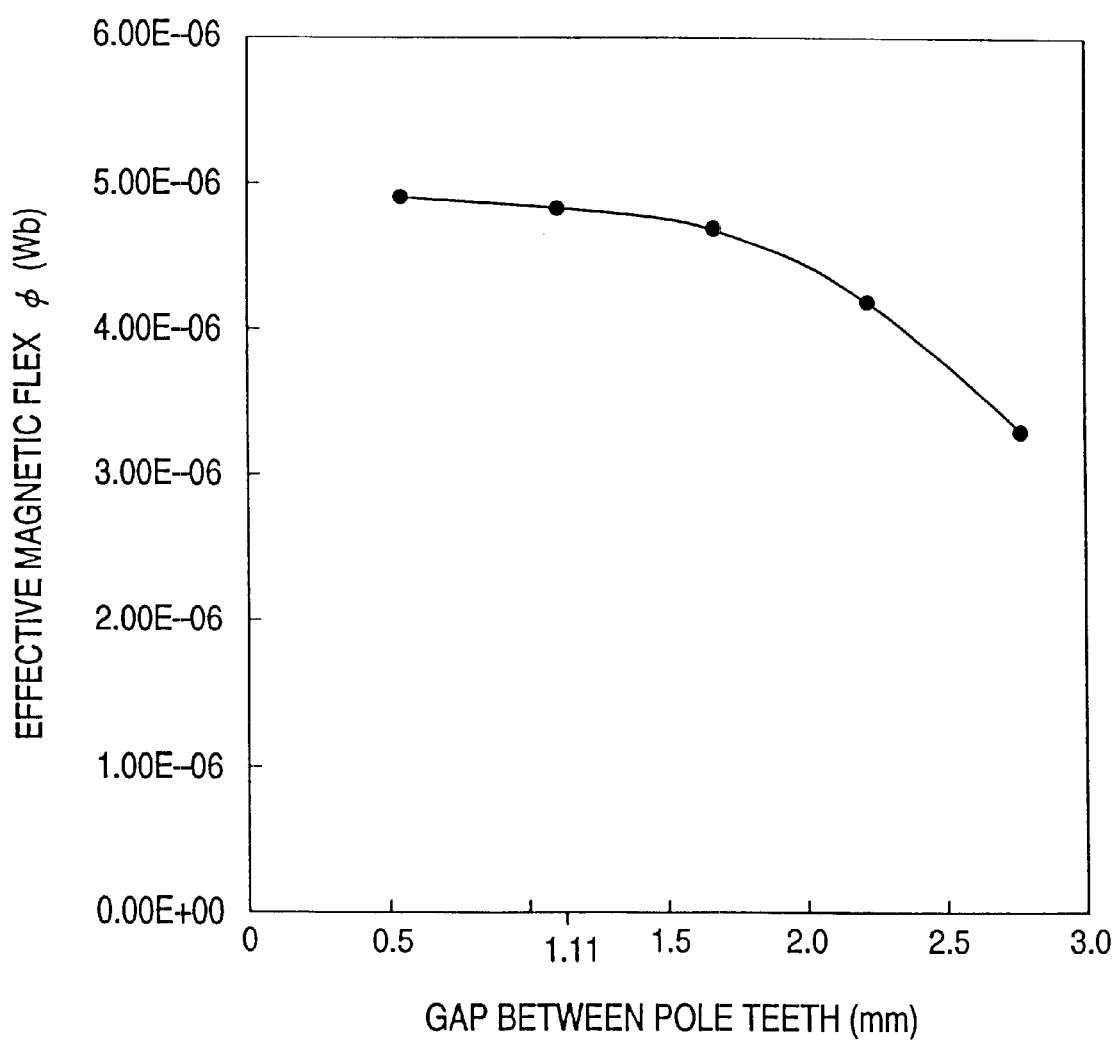
FIG. 6 is a graph showing a relationship between the circumferential gap between the respective pole teeth of the small-sized hydroelectric power generating apparatus and an effective magnetic flux.

In case that the gap G2 is formed narrowly, the area of the tooth area becomes large, so that the effective magnetic fluxes that reaches the respective pole teeth 61a, 62a from the rotator magnet Mg become large and the rotation of the water wheel 3 can be effectively changed into the electric power generating force. Namely, as shown in FIG. 6, in case that the gap G2 between the respective pole teeth becomes wide, specifically when the gap G1 is set to 0.7 mm, in case that the gap G2 is set to 1.6 mm or more, the effective fluxes decrease sharply. Therefore, from a viewpoint of the effective magnetic fluxes, it is desirable that the gap G2 between the respective pole teeth is set to at least 1.6 mm or less. Further, in order to satisfy the reduction of the detent torque and the acquirement of the effective magnetic flux, it is necessary to set the circumferential gap G2 to about 1.5 times or less the size of the magnetic gap G1, and this value is adopted in this embodiment of the present invention.

Further, in this mode for carrying the invention, the gap G2 between the respective pole teeth is narrowed and together the above-mentioned various constitutions are provided, whereby the detent torque is reduced. A difference between the conventional apparatus in which such the constitution is not provided and each embodiment of the small-sized hydroelectric power generating apparatus of the invention having at least such the constitution that the gap G2 between the respective pole teeth is narrowed will be described below with reference to FIG. 7.

Figure 7:
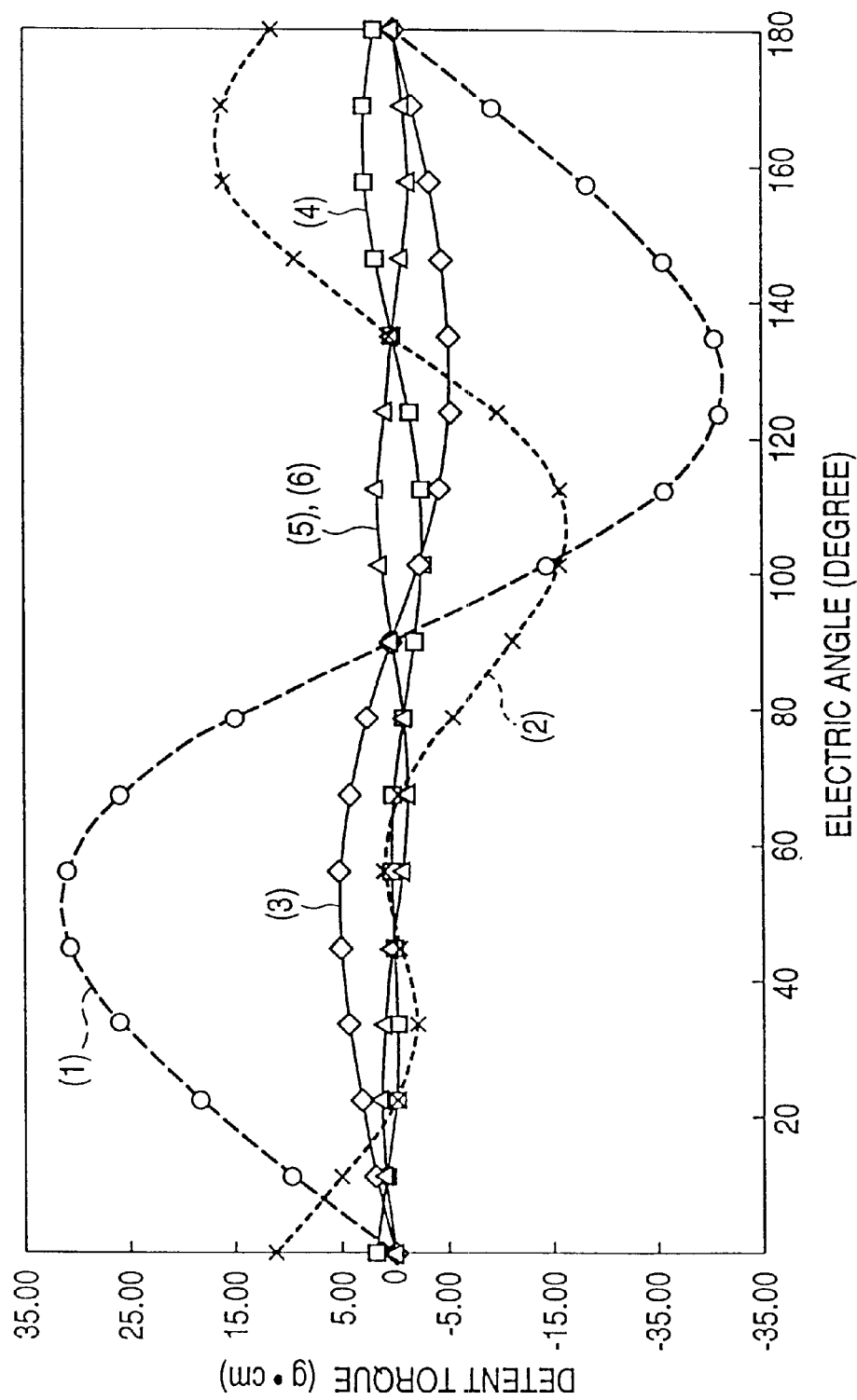
FIG. 7 is a diagram for comparing, in a relationship between an electric angle and a detent torque, a conventional small-sized hydroelectric power generating apparatus with a small-sized hydroelectric power generating apparatus in each embodiment of the invention. A graph (1) shows the relationship in the conventional type in which the gap between the respective pole teeth is large and the stator portion is composed of one phase. A graph (2) shows the relationship in a type in which the gap between the respective pole teeth is large and the stator portion is composed of two phases. A graph (3) shows the relationship in a small-sized hydroelectric power generating apparatus according one embodiment of the invention in which the stator portion is composed of one phase. A graph (4) shows the relationship in a small-sized hydroelectric power generating apparatus according to another embodiment of the invention in which the stator portion is composed of two phases. A graph (5) shows the relationship in a type in which in addition to the constitution (4), magnetic insulation is applied between inner stator cores of two phases. A graph (6) shows the relationship in a type in which in addition to the constitution (5), outer portions of outer stator cores of the two phases are contacted to each other and coupled to each other magnetically.

Each graph shown with (1) to (6) in FIG. 7 shows relationship between an electric angle (phase difference) in each type of small-sized hydroelectric power generating apparatus described below and a detent torque. A graph (1) shows the relationship in the conventional small-sized hydroelectric power generating apparatus in which the gap between the respective pole teeth is large (1.5 mm or more) and the stator portion is composed of not two phases but one phase unlike the stator portion in the above-mentioned mode. A graph (2) shows the relationship in a small-sized hydroelectric power generating apparatus in which the gap between the respective pole teeth is large (1.5 mm or more) and the stator portion is composed of two phases like the stator portion in the above-mentioned mode. Graphs (3) to (6) show an embodiment of the invention respectively, in which the gap between the respective pole teeth is narrow (about 0.6 mm). A graph (3) shows the relationship in a small-sized hydroelectric power generating apparatus in which a stator portion is composed of not two phases but one phase unlike the stator portion in the above-mentioned mode. A graph (4) shows the relationship in a small-sized hydroelectric power generating apparatus in which a stator portion is composed of two phases like the stator portion in the above-mentioned mode. A graph (5) shows the relationship in a small-sized hydroelectric power generating apparatus in which in addition to the constitution (4), magnetic insulation is applied between the inner stator cores of the two phases. A graph (6) shows the relationship in a small-sized hydroelectric power generating apparatus in which in addition to the constitution (5), the outer portions of the outer stator cores of the two phases are contacted to each other and coupled to each other magnetically.

As shown in FIG. 7, though the graph (1) is composed of a sine wave, its waveform is large and detent torque is very large. Therefore, such a disadvantage is produced that the water wheel does not rotate with a small amount of flowing water, it does not rotate smoothly even if it rotate, or the like. Further, in the graph (2), since the stator portion is composed of the two phases, a waveform itself becomes smaller than that in the apparatus in which the stator portion is composed of one phase, and the detent torque becomes small. However, the waveform is not a sine wave. Therefore, the smooth rotation of the water wheel cannot be expected. Further, the detent torque is not smaller than each detent torque in the graphs (3) to (6).

In the graph (3), the stator portion is a one-phase type in which the detent torque is larger than that in a two-phases type. However, since the gap between the respective pole teeth is made small, the detent torque is reduced largely. In addition, since its waveform is approximate to a sine wave, the water wheel 3 can rotate smoothly. In the graph (4), since the stator portion is composed of two phases, the detent torque becomes smaller than that in the graph (3), so that the water wheel 3 can rotate more smoothly. On the other hand, graphs (5) and (6) is more decreased in the detent torque as compared with graphs (3) and (4).

The above-mentioned mode for carrying out the invention is an example of the preferred modes for carrying out the invention, however the invention is not limited to this. Without departing from the spirit and the scope of the invention, various changes and modifications may be made. For example, in the small-sized hydroelectric power generating apparatus of the above mode, the magnetic insulation is applied between the both inner stator cores 62, 62, and the both outer stator cores 61, 61 are magnetically connected to each other at their peripheral portions, whereby much reduction of the detent torque is realized. However, these both constitutions may not be adopted.

Further, in the above mode, since the gap between the pole teeth 61a, 62a is made narrow, there is fear that the both pole teeth 61a, 62a come into contact with each other due to an assembly error. However, in order to prevent this contact, a spacer may be provided between the pole teeth 61a and 62a. Further, in the above mode, though the stator portion 6 used as a power generator is a two-phases stepper motor type, the power generator may be a one-phase type.

Further, in the above mode, as shown in FIG. 4, each of the pole teeth 61a, 62a is formed nearly in the shape of a trapezoid, whereby the detent torque is further reduced and the effective magnetic fluxes are acquired. However, the shape of each of the pole teeth 61a, 62a is not limited by trapezoid, but may be rectangular or triangle. The apparatus in this case is inferior in reduction of the detent torque and acquirement of the magnetic flux to the apparatus in which each of the pole teeth is formed nearly in the shape of a trapezoid. However, if the circumferential gap of the respective pole teeth is narrowed, more effects are produced than the effects in the conventional small-sized hydroelectric power generating apparatus. The detent torque is further reduced.

Figure 9:
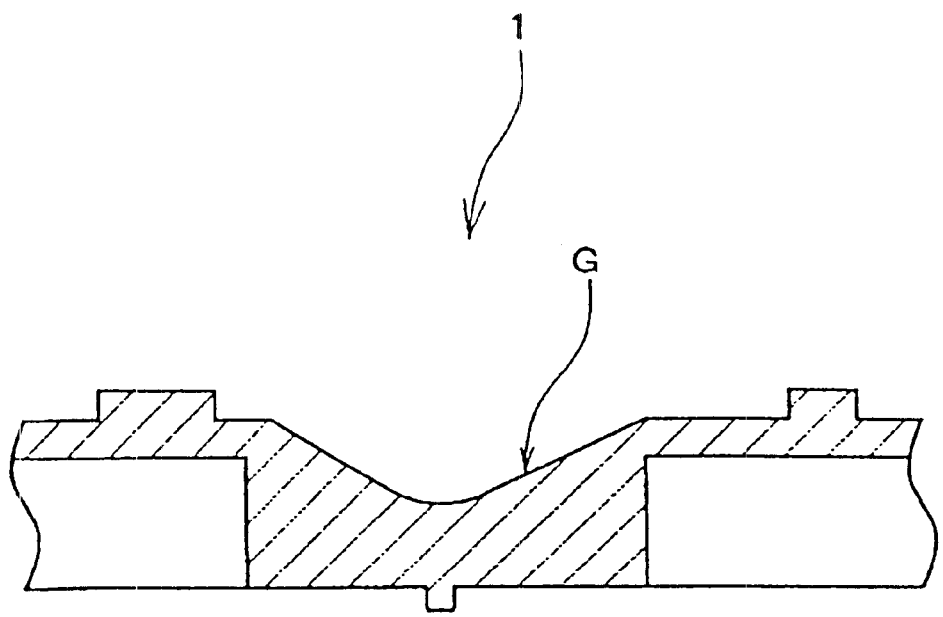
FIG. 9 is a sectional view of a portion shown of two-dot chain lines shown with an arrow IV in FIG. 8.

Next, the water-spouting portion 2 will be described in detail with reference to FIGS. 8 and 9. FIG. 8 is a plan diagram viewed from a direction of an arrow I in FIG. 1, in which the stator portion, the cap-shaped case and the cover are removed. Further, FIG. 9 is a sectional view of a portion of two-dot chain lines shown by an arrow IV in FIG. 8.

As described above, the water-spouting portion 2 is provided inside the main body 11 of the body case 1. This water-spouting portion 2, as shown in FIG. 8, comprises five water spouting walls 20a, 20b, 20c, 20d, and 20e that are erectly formed integrally with the body case 1, and a cover 15 (refer to FIGS. 1 and 10) provided at a boundary portion between the body case 1 and the cap-shaped case 5. These five water spouting walls 20a, 20b, 20c, 20d, 20e are dividedly arranged so as to surround the periphery of the vane portions 31 (omitted in FIG. 8. Refer to FIG. 1) of the water wheel 3, and gaps between the water spouting walls are used as four ejection holes 22a, 22b, 22c and 22d from which water is blown on the vane portions 31 of the water wheel 3.

A recess portion 20f is formed at the leading end of each of the water spouting walls 20a, 20b, 20c, 20d, 20e, and a convex portion 15f formed at the cover 15 is fitted into this recess portion 20f, whereby the cover 15 and each of the water spouting walls 20a, 20b, 20c, 20d, and 20e are united. The leading ends of the thus formed water spouting walls 20a, 20b, 20c, 20d, and 20e are formed on the same plane surface continuous to the above-mentioned step portion 14b.

Further, the radial outer portions of these five water spouting walls 20a, 20b, 20c, 20d, 20e, which are located inside of the main body 11 of the body case 1, are used as a groove-shaped round passage 21 where water that has entered from the inlet 12 can move. The predetermined slop is provided for this round passage 21 in order to suitably distribute the flowing amount of water from the inlet 12 side of the fluid passage to each of the ejection holes 22a, 22b, 22c, 22d so that the pressure loss is reduced (refer to a reference character R1 in FIG. 1 and a reference character G in FIG. 9). FIG. 9 shows a slope on an entrance side of the round passage 21 (slope in the vicinity of the outer surface of the water spouting wall on the inlet 13 side (partially including a portion that is not the round passage 21)).

The first water spouting wall 20a is provided on the inlet 12 side. The water that has entered from the inlet 12 to the main body 11 linearly dashes firstly on the peripheral surface of the first water spouting wall 20a. Then, the water that has dashed is divided by this first water spouting wall 20a, moves in the above-mentioned round passage 21 counterclockwise to flow into the second and third water spouting walls 20b, 20c, and together moves clockwise to flow into the fourth and fifth water spouting walls 20d, 20e.

To the counterclockwise side of the first water spouting wall 20a, the second water spouting wall 20b is adjacent. The adjacent end portions of the first water spouting wall 20a and the second water spouting wall 20b are formed nearly in parallel with each other. This gap portion functions as the first ejection hole 22a for ejecting water from the round passage 21 to the vane portion 31 of the water wheel 3 arranged inside. This first ejection hole 22a is a rectangular hole formed by fitting the above cover 15 and covering the portion between the first and second water spouting walls 20a, 20b with the plane portion 15a of this cover 15.

To the counterclockwise side of the second water spouting wall 20b, the third water-spouting wall 20c is adjacent. The adjacent end portions of the second water spouting wall 20b and the third water spouting wall 20c are also formed nearly in parallel with each other. This gap portion functions as the second ejection hole 22b. Further, to the clockwise side of the first water spouting wall 20a, the fourth water spouting wall 20d is adjacent. The adjacent end portions of the first water spouting wall 20a and the fourth water spouting wall 20d are also formed nearly in parallel with each other. This gap portion functions as the third ejection hole 22c. Further, to the clockwise side of the fourth water spouting wall 20d, the fifth water-spouting wall 20e is adjacent. The adjacent end portions of the fourth water spouting wall 20d and the fifth water spouting wall 20e are also formed nearly in parallel with each other. This gap portion functions as the fourth ejection hole 22d. Two inner walls of the thus formed four ejection holes 22 (adjacent and opposite end surfaces of the respective water spouting walls is not formed linearly toward a rotational center position o1 but formed with an angle so as to be opposed orthogonally to the vane portion 31 of the water wheel 3.

At the peripheral end portion on the first water spouting wall side of the second water spouting wall 20b, an extension part 21a that is extended to the round passage 21 side is formed. On this extension part 21a, the water that has dashed on the first water spouting wall 20a and moved counterclockwise dashes. A part of the water that has thus dashed on the extension part 21a is ejected through the above first ejection hole 22a to the water wheel 3.

Further, at the peripheral end portion on the first water spouting wall side of the fourth water spouting wall 20d, an extension part 21b having the same effect as the effect of the above-mentioned extension part 21a is formed. Namely, on this extension part 21b, the water that has dashed on the first water spouting wall 20a and moved clockwise dashes. A part of the water that has dashed on the extension part 21b is ejected through the above third ejection hole 22c to the water wheel 3.

In the above-mentioned mode, one axial side (cover 15 side) of each of the ejection holes 22a, 22b, 22c, and 22d is opened. Therefore, when the body case 1 is molded, the body case 1 can be formed with a split mold that is divided into two axially (in the upper and lower directions in FIG. 1). Further, on the side of the body case 1 where the water spouting walls 20a, 20b, 20c, 20d, 20e are formed, the round passage 21 is formed in order to eject the water uniformly and efficiently to the water wheel 3 from the four ejection holes 22a, 22b, 22c, 22d. This round passage 21 can be formed with the simple split mold. Accordingly, in this mode for carrying out the invention, the apparatus including the water-spouting portion 2 for rotating the water wheel 3 efficiently can be readily molded with the simple split mold.

The constitution in which the one axial side of each of the above-mentioned ejection holes 22a, 22b, 22c, 22d is opened and another member is put on this opened portion itself obtains an effect of forming the complicated water spouting portion 2 with the simple bi-directional split mold.

Namely, this constitution obtains another independent effect than the effects in the constitution in which the water spouting walls 20, 20b, 20c, 20d, 20e are formed integrally with the body case 1 having the bearing hole 11b for supporting one end of the shaft 7 in order to make accurate the positional relation among each of the ejection holes 22a, 22b, 22c, 22d, the inner walls of the water spouting walls 20a, 20b, 20c, 20d, 20e, and the shaft 7 for supporting the rotation of the water wheel 3. In this case, the water-spouting portion 2 may be formed separately from the body case 1.

Between the above-mentioned third water spouting wall 20c and the fifth water spouting wall 20e, a gap 28 is formed, which is formed at an angle of 60 degrees on the inner side. This gap 28 becomes a space between the opposed parallel end surfaces of the third water spouting wall 20c and the fifth water spouting wall 20e, and is located between the above-mentioned outlet 13 and the rotational center position o1.

Further, the cover 15 that is arranged on the leading ends of the thus constructed water spouting walls 20a, 20b, 20c, 20d, 20e, and put on the step portion 16 of the body case 1, as shown in FIGS. 10A and 10B, comprises a doughnut-shaped plane surface portion 15a having a hole 15c at its center, convex walls 15b and 15f that are erectly provided on one surface of this plane surface portion 15a, and a rib 15d that is erectly provided on the other surface of this plane surface portion 15a. The convex wall 15b is arranged so as to be fitted into a part of the above-mentioned gap 28 between the third water spouting wall 20c and the fifth water spouting wall 20e. The rectangular hole formed by this gap 28 and the convex wall 15b in the gap 28 is used in order to communicate the portion surrounded with the water spouting walls 20a, 20b, 20c, 20d, 20e and the outlet 13. The convex portions 15f are fitted into the recess portions 20f of the water spouting walls 20a, 20b, 20c, 20d, 20e as described above. Further, the rib 15d comes into contact with the coupling surface 5d of the cap-shaped case 5.

The small-sized hydroelectric power generating apparatus of the invention is provided in that the circumferential gap between the adjacent pole teeth of the stator portion is set to 1.5 times or less the size of the radial gap between each pole tooth and the rotor magnet. By thus narrowing the gap between the teeth more largely than the gap in the conventional apparatus, the detent torque is reduced, the water wheel and the rotator can rotate even with a small amount of flowing water, and power generation can be performed efficiently. Further, since this constitution makes the effective magnetic flux large, the rotation of the water wheel can be efficiently changed into the electric power generating force, so that the power generation can be performed efficiently even with a small amount of the flowing water.

Further, according to the small-sized hydroelectric power generating apparatus of the invention, at least a part of the water-spouting portion is formed integrally with the body case, and the supporting member for holding one end of the shaft for supporting the rotation of the water wheel is provided for the body case. Therefore, it is possible to make good the positional accuracy between the water spouting portion and the shaft for supporting the rotation of the water wheel, and correspondingly to make good the rotational accuracy of the water wheel. For this reason, it is also possible to narrow the distance (gap) between the peripheral end of the water wheel and the inner wall of the water-spouting portion. As a result, the fluid blown from the ejection holes can be efficiently dashed on the water wheel, whereby the water wheel can be efficiently rotated and the power generating efficiency can be improved. Therefore, the power generation can be performed even with a small amount of the flowing water.

Further, according to the small-sized hydroelectric power generating apparatus of another aspect, one axial side of the ejection hole of the water-spouting portion is opened and this opened portion is pushed from the other side. Therefore, such the constitution that the number of the ejections holes of the water spouting portion is set to three, four, or more and the ejection holes are orthogonally opposed to the vane portions of the water wheel in order to heighten the rotational efficiency of the water wheel can be formed by a simple bi-directional split mold. Accordingly, a small-sized hydroelectric power generating apparatus which has such the complicated inner constitution and which is good in the rotational efficiency can be manufactured at a low cost.

What is claimed is:

1. A small-sized hydroelectric power generating apparatus comprising:
   a body case having a fluid passage;
   a water wheel provided at the above fluid passage and rotating with passing of the fluid having the predetermined flowing amount;
   a rotator coupled to this water wheel, and rotating with the water wheel, the rotator serving as a rotor portion arranged opposed to a stator portion, the rotor portion being relatively rotated in relation to the stator portion by passing the fluid to generate electric power, the stator portion having comb-shaped pole teeth which are arranged in the circumferential direction at regular intervals so as to be opposed to the peripheral surface of a rotor magnet of the above rotor portion; and
   a circumferential gap between the adjacent pole teeth is set to 1.5 times or less the size of a radial gap between each pole tooth and the rotor magnet.

2. A small-sized hydroelectric power generating apparatus according to claim 1, wherein said stator portion is defined by two phases that are in the different phase.

3. A small-sized hydroelectric power generating apparatus according to claim 2, wherein the stator cores of said two-phases stator portion are magnetically insulated therebetween.

4. A small-sized hydroelectric power generating apparatus according to claim 3, wherein two stator cases are provided so as to respectively cover said two-phases stator portion, and the stator cases are magnetically connected.

5. A small-sized hydroelectric power generating apparatus according to claim 1, wherein each of said pole teeth is formed nearly in the trapezoid shape.

6. A small-sized hydroelectric power generating apparatus comprising:
   a body case having a fluid passage;
   a water wheel provided at the above fluid passage and rotating with passing of the fluid having the predetermined flowing amount;
   a rotator coupled to this water wheel, and rotating with the water wheel, the rotator serving as a rotor portion arranged opposed to a stator portion, the rotor portion being relatively rotated in relation to the stator portion by passing the fluid to generate electric power;
   a support member, for holding one end of a shaft for supporting rotation of the water wheel, provided for the above body case;
   a water spouting portion, provided to the fluid passage, having an ejection hole from which the fluid is blown on vanes of the above water wheel with the flowing amount being throttled; and
   at least a part of the water spouting portion is provided integrally with the body case.

7. A small-sized hydroelectric power generating apparatus comprising:
   a body case having a fluid passage;
   a water wheel provided at the above fluid passage and rotating with passing of the fluid having the predetermined flowing amount;
   a rotator coupled to this water wheel, and rotating with the water wheel, the rotator serving as a rotor portion arranged opposed to a stator portion, the rotor portion being relatively rotated in relation to the stator portion by passing the fluid to generate electric power; and
   a water spouting portion, provided to the fluid passage, having an ejection hole from which the fluid is blown on vanes of the above water wheel with the flowing amount being throttled, the ejection hole being constituted as to be opening in the axial direction of a shaft for rotatably supporting, the opening is closed by members to form the ejection hole.

8. A small-sized hydroelectric power generating apparatus according to claim 6, wherein the water spouting portion is defined by plural walls formed integrally with the body case and a cover put on leading ends of these walls, and the ejection hole is opened to the cover side and the cover is put on the ejection hole to form the ejection hole.

9. A small-sized hydroelectric power generating apparatus according to claim 6, wherein a plurality of said ejection holes are provided in the circumferential direction nearly uniformly, and a slope for suitably distributing the flowing amount from the inlet side of said fluid passage to each ejection hole is formed at the peripheral portion of said water spouting portion.

10. A small-sized hydroelectric power generating apparatus according to claim 6, wherein said body case is fitted to a cap-shaped case to form an inner space, said rotator is provided in this inner space, and this inner space and said stator portion are separated from each other, and further comprising:
    a recess portion provided at a fitting portion defined between the body case to the cap-shaped case;
    an opposing wall opposed to an inner wall of the above recess wall is provided for a fitting portion defined between the above cap-shaped case to said body case,
    a ring-shaped elastic seal member provided between the opposing wall and the inner wall of the recess portion in the direction orthogonal to a fitting direction when the cap-shaped case is fitted into said body case while the cap-shaped case is being pressed against said body case; and
    supporting members respectively supporting both ends of the shaft for supporting the rotator, the supporting members being provided for the body case and the cap-shaped case.

11. A small-sized hydroelectric power generating apparatus according to claim 7, wherein the water spouting portion is defined by plural walls formed integrally with the body case and a cover put on leading ends of these walls, and the ejection hole is opened to the cover side and the cover is put on the ejection hole to form the ejection hole.

12. A small-sized hydroelectric power generating apparatus according to claim 7, wherein a plurality of said ejection holes are provided in the circumferential direction nearly uniformly, and a slope for suitably distributing the flowing amount from the inlet side of said fluid passage to each ejection hole is formed at the peripheral portion of said water spouting portion.

13. A small-sized hydroelectric power generating apparatus according to claim 7, wherein said body case is fitted to a cap-shaped case to form an inner space, said rotator is provided in this inner space, and this inner space and said stator portion are separated from each other, and further comprising:

a recess portion provided at a fitting portion defined between the body case to the cap-shaped case;

an opposing wall opposed to an inner wall of the above recess wall is provided for a fitting portion defined between the above cap-shaped case to said body case, a ring-shaped elastic seal member provided between the opposing wall and the inner wall of the recess portion in the direction orthogonal to a fitting direction when the cap-shaped case is fitted into said body case while the cap-shaped case is being pressed against said body case; and supporting members respectively supporting both ends of the shaft for supporting the rotator, the supporting members being provided for the body case and the cap-shaped case.

* * * * *